US005193790A

United States Patent [19]

Flaten

[11] Patent Number: 5,193,790

[45] Date of Patent: Mar. 16, 1993

[54] MOVABLE BEAM TYPE HOLD-DOWN CLAMP FOR MACHINE WORK TABLES

[76] Inventor: John T. Flaten, 207 Tailback Rd., Troy, Mont. 59935

[21] Appl. No.: 732,158

[22] Filed: Jul. 18, 1991

[51] Int. Cl.$^5$ .......... B23Q 3/02

[52] U.S. Cl. .......... 269/91; 269/94; 269/246; 269/282

[58] Field of Search .......... 269/91, 94, DIG. 902, 269/239, 246, 282; 254/130

[56] References Cited

U.S. PATENT DOCUMENTS

| | | | |
|---|---|---|---|
| 2,339,897 | 1/1944 | Wetzler | 269/94 |
| 2,395,242 | 2/1946 | Anderson | 269/203 |
| 3,107,910 | 10/1963 | Wiemken | 269/211 |
| 3,204,947 | 8/1963 | Sendoykas | 269/94 |
| 4,245,827 | 1/1981 | Goff et al. | 269/94 |

FOREIGN PATENT DOCUMENTS

| | | | |
|---|---|---|---|
| 339 | of 1906 | United Kingdom | 269/94 |

OTHER PUBLICATIONS

The American Machinist ("Clamp") Jan. 26, 1959, pp. 152, 269-294.

*Primary Examiner*—Bruce M. Kisliuk
*Assistant Examiner*—Eileen P. Morgan
*Attorney, Agent, or Firm*—Keith S. Bergman

[57] ABSTRACT

A clamp to hold a workpiece on a machine work table provides a body carrying an elongate fastening beam extending therefrom for adjustable positioning over a portion of the workpiece. The beam pivotally carries a vertically depending holder arm in a first outer end portion and is carried at a second inner end in the clamp body structure for both axial and vertically angulated motion. The clamp body is releasably fastenable to the machine work table and defines a vertically extending channel to receive the fastening beam. A vertically adjustable support pin extends horizontally through the channel to support the second beam end and the body carries a fastening screw depending into the channel spacedly distant toward the first support beam end to contact the medial portion of the support beam and create downward force thereon to hold a workpiece supported on the machine work table.

4 Claims, 2 Drawing Sheets

FIG. I

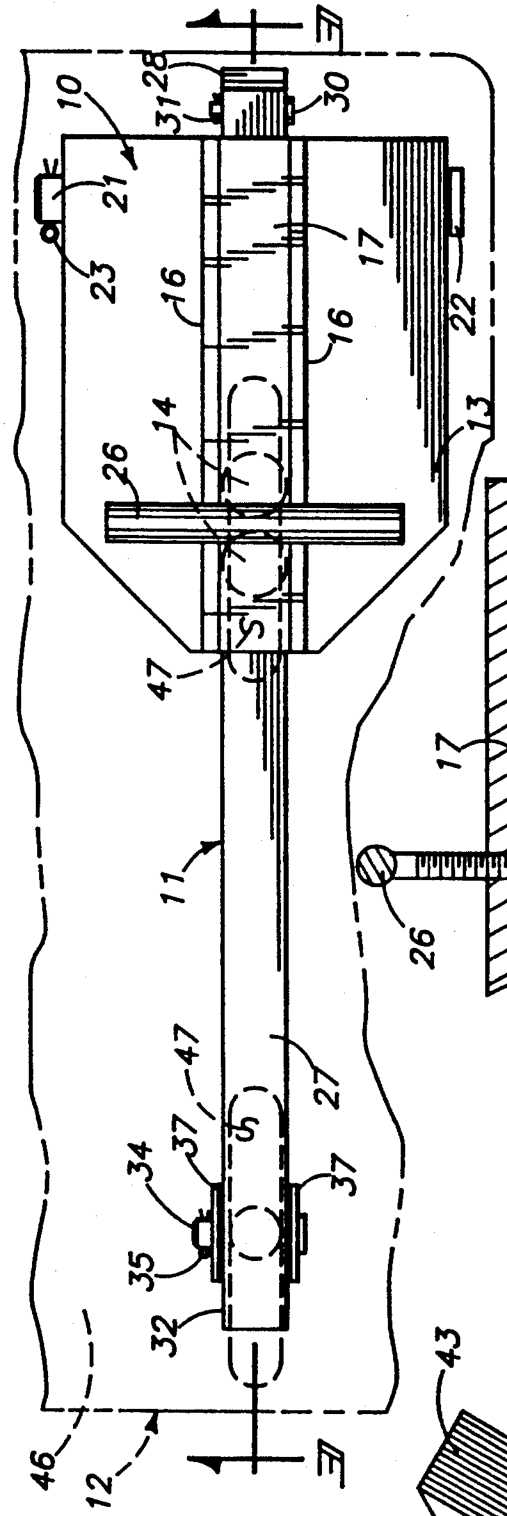
FIG. 2
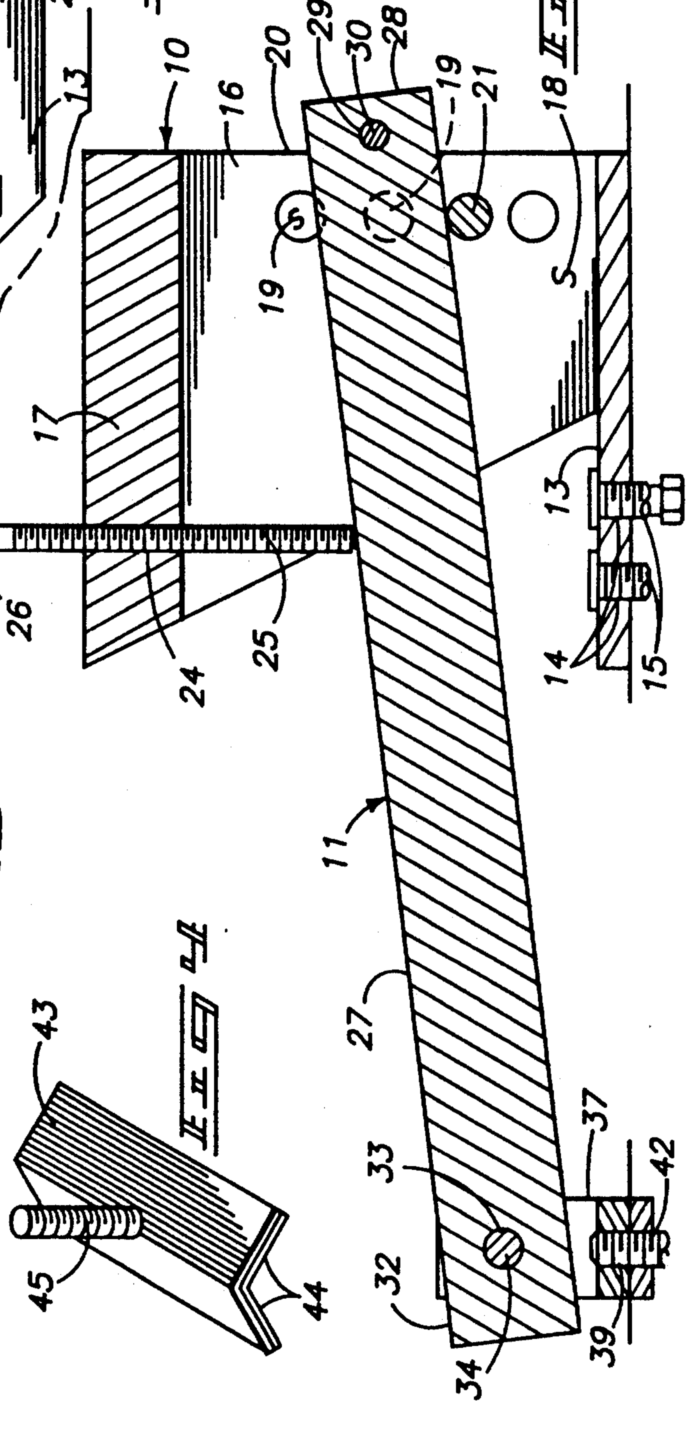
FIG. 3
FIG. 4

MOVABLE BEAM TYPE HOLD-DOWN CLAMP FOR MACHINE WORK TABLES

BACKGROUND OF INVENTION

Related Applications

There are no applications related hereto heretofore filed in this or any foreign country.

FIELD OF INVENTION

My invention relates generally to clamps to hold a workpiece on a machine work table, and more particularly to such a clamp that has an elongate beam fastenably and adjustably carried by a body to hold a workpiece against the machine table at adjustable positions spaced from the body.

BACKGROUND AND DESCRIPTION OF PRIOR ART

Many machines used by mechanics provide flat work tables for support of a workpiece during machining operations and, though those tables almost universally provide a plurality of variously spaced, configured and arrayed holes and slots defined in the work table to aid in fastening holding devices thereto, the tables do not per se provide means to directly fasten or hold a workpiece on the table. Since it generally is necessary to uniquely positionally maintain a workpiece on a machine table when machining is being performed on the workpiece, many and various fastening and clamping devices have become known for such purpose. The instant invention provides a new and novel member of this class of clamping device.

Known machine table clamps have generally provided a body structure fastened to a machine work table with some type of holding arm carried by the body and extending therefrom for adjustable positioning relative thereto so that a workpiece may be positionally maintained on the work table between the outer end of the holding arm and the work table surface therebeneath.

Such clamp devices may be classified for convenience of consideration by the method and manner in which the holding arm is movable relative to the clamp body. Such devices generally must move the holding arm in at least a vertical direction for the clamp to be operative. A first class of clamps allows vertical motion of the holding arm only in a fashion that maintains it in parallel positions and most commonly in positions parallel to the work table therebeneath. A second class of such clamps allows vertical motion of the fastening arm in an angulated fashion relative to the body. A third class of clamps allows not only vertically angulated motion of the holding arm as in the first two classes of clamps, but also allows selective elongate motion of the arm in an axial direction relative to its mounting in the clamp body structure. My invention presents a clamp of the third class that is readily distinguishable mechanically from members of the first and second classes of clamps by reason of the different structures required to allow the motions provided by those clamps, as set forth.

All three classes of clamp devices allow selective positioning and orientation of a clamp body on a machine work table, generally by means of bolting or use of similar type fasteners, but clamps of the third class are more versatile in their operation and use because they allow the holding of a workpiece at selective positions at varying distances from the clamp body, while yet providing the same benefits as clamps of the first and second class.

It is advantageous but often not accomplished in clamps having clamping arms that may be angularly oriented relative to the clamp body to maintain the clamping arms in an orientation somewhat parallel to the work supporting table. In such position the forces generated in the clamping arm when holding a workpiece will be substantially vertically oriented with no substantial component in a horizontal direction that might tend to lessen the vertical downward force by dissipating some of the total force in a direction parallel to the work table. This result is accomplished in two fashions in my clamp.

Firstly, the holding arm is supported on the undersurface of its rearward portion by a support pin carried by the body, and provision is made for adjustable vertical positioning of this support pin so that the supported end portion of the holding arm may be maintained at various vertical positions to allow much more horizontally oriented positioning of the arm than would be allowed were the rearward portion of the arm supported at a single pivot point. Secondly, the opposed fastening end portion of the holding arm is provided with a depending fastening arm that is pivotally mounted on the holding arm so that with any vertically angulated orientation of the holding arm the workpiece contacting surface of the fastening arm can be parallel to the workpiece surface or the supporting table.

Such a holding arm provides additional benefits as it may carry a workpiece contacting shoe to provide a more areal extensive contact with a workpiece surface that is irregular or not parallel to the workpiece table. Additionally, the workpiece contacting shoe may be variously configured to accommodate variously shaped surfaces of workpieces which it is to hold. One particular shape of particular note in this regard is an inverted "V" shape which is well adapted to hold small curvilinear surfaces, especially such as circular cylinders, pipe, rods and the like that are commonly encountered in machining work.

My clamp is further distinguished from other clamps of the third described class by reason of its simplicity, both in parts and also in their mechanical relationships. My clamp provides a simple two point support for the holding arm, with a rearward portion of the undersurface supported on a pin and the medial portion of the upper surface contacting a depending screw for adjustable clamping action. Other known clamps that allow lineal motion of a clamping arm along its axis have provided more complex supporting structures and mechanical interconnections that make them cumbersome to use, expensive of manufacture, of lesser strength per unit of weight and of less reliability than my clamping structure. Though prior devices show individual features of my invention, none of those prior devices show all of the features of my invention combined in the same fashion for similar purposes as in my device.

My invention resides not in any one of the individual features described, but rather in the synergistic combination of all of the structures of my clamp that necessarily give rise to the functions flowing therefrom, as herein specified and claimed.

SUMMARY OF INVENTION

My clamp provides a flat base releasably fastenable to a machine table and an upstanding body defining a medial channel carrying the inner end portion of an elongate holding arm for axial and vertically angulated motion. The rearward portion of the body carries a support pin extending through the channel in vertically adjustable positions to support the undersurface of a first inner end of the holding arm. The forward portion of the upstanding body spacedly distant from the support pin threadedly carries a vertically oriented fastening screw that depends into the body channel to contact the upper surface of the medial portion of the holding arm. The second outer end portion of the holding arm extends a spaced distance from the body and the base to carry in its outer end a pivotally interconnected depending workpiece contacting arm for contact with a workpiece. The workpiece contacting arm releasably carries a workpiece contacting shoe. The holding arm may be forced downwardly by the fastening screw to hold a workpiece between the workpiece contacting shoe and machine table therebeneath.

In creating such a clamp, it is:

A principal object to provide a workpiece clamp for machine work tables that has a body releasably fastenable to the machine work table with a holding arm extending spacedly therefrom for adjustable motion in an axial direction and in an angulated vertical direction.

A further object is to provide such a clamp wherein the rearward portion of the holding arm carried in the clamp body may be adjustably vertically positioned relative to the clamp body.

A still further object is to provide such a clamp that has an elongate holding arm that pivotally mounts a depending workpiece contacting arm which releasably carries a workpiece contacting shoe which may be of various shapes.

A still further object is to provide such a clamp that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment of the best known mode of operation being illustrated and specified as is required.

BRIEF DESCRIPTION OF DRAWINGS

In the accompanying drawings which form a part hereof and wherein like numbers of reference refer to similar parts throughout:

FIG. 2 is an orthographic top view of the clamp of FIG. 1, positioned on a machine work table shown in dashed outline.

FIG. 3 is a medial vertical cross-sectional view through the clamp of FIG. 2, taken on the line 3—3 thereon in the direction indicated by the arrows.

FIG. 4 is a partially cut-away, isometric view of the workpiece contacting arm with a "V" shaped workpiece contacting shoe carried therein.

DESCRIPTION OF THE PREFERRED EMBODIMENT

Figure 1:
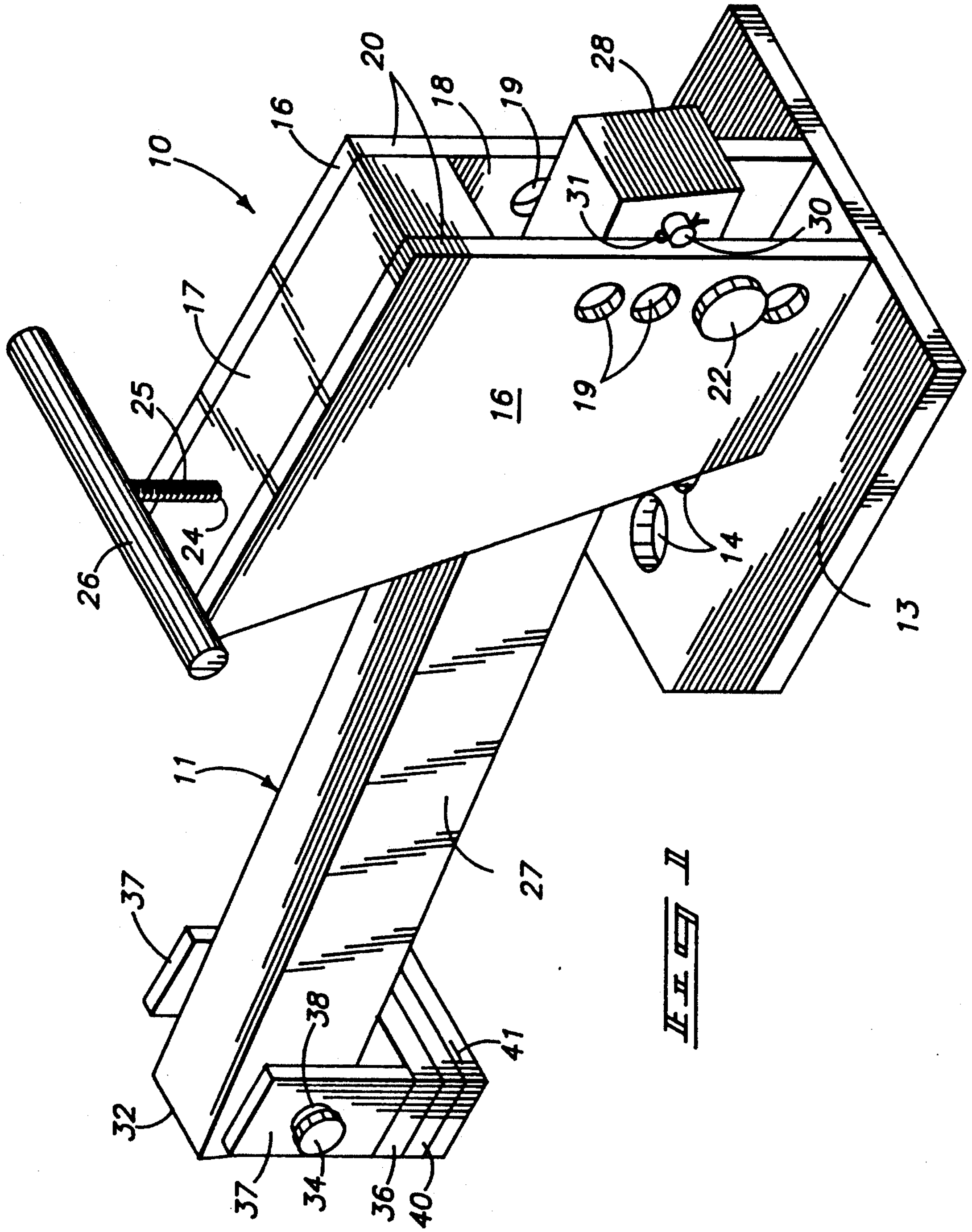
FIG. 1 is an isometric surface view of my clamp showing its various parts, their configuration and relationship.

My hold-down clamp generally provides body 10 movably carrying elongate holding arm 11 to fasten a workpiece on machine table 12.

Body 10 provides flat base plate 13 defining in its forward medial portion two spaced fastening holes 14 to receive bolts 15 or other similar fasteners to releasably fasten the base plate to machine table 12. The rearward medial portion of base plate 13 structurally carries upstanding pillar-like holding arm housing formed by similar parallel upright spaced sides 16 interconnected in their upper portions by top 17 to define medial channel 18 which receives the inner rearward portion of holding arm 11 in a movable fit.

Each housing side 16 defines a plurality of similar opposed cooperating support pin holes 19, inwardly adjacent rearward vertical edge 20. These support pin holes 19, in the instance illustrated, are arrayed with their centers on a line perpendicular to the base plate and though this configuration is not necessary to my invention, the holes must be defined in the rearward portion of the sides 16, must be arrayed in cooperating pairs, and must be in vertically spaced relationship. Support pin 21, having enlarged head 22 at one end and releasable fastening pin 23 inwardly adjacent the other end, has a length to extend between opposed pairs of cooperating holes and project a spaced distance therebeyond to allow releasable fastening on the housing side 16 opposite that carrying head 22. The number of support pin holes 19 and their vertical spacing is not critical to my invention, but the greater the number of holes and the finer the spacing between holes, the finer is the adjustment allowed in positioning a support arm relative to the body 10.

The forward, laterally medical portion of the top 17 defines threaded hole 24 extending vertically therethrough. Elongate fastening screw 25 threadedly engages within hole 24 to extend spacedly therebelow into channel 18 to adjustably contact the upper surface of holding arm 11 carried within the channel, as illustrated especially in FIG. 3. The upper portion of fastening screw 26 provides structurally interconnected, diametrically extending rod-like handle 26 to aid manual turning of the screw and allow application of some leveraged force in so doing.

Holding arm 11 provides elongate rigid beam 27 of a length such as to extend a spaced distance forwardly from the body structure. This length is not critical to my invention, though in general it should be such as to allow the holding arm to extend beyond forward portion of base plate 13 and should not be so great as to make clamp operation inconvenient on a machine table of ordinary size nor to require the use of excessive force to cause appropriate holding of a workpiece. In the instance shown rigid beam 27 is formed as a solid beam though this cross-sectional configuration is not necessary to my invention and peripherally defined box beams having an internal channel or beams of other cross-sectional configuration that provide appropriate strength are quite usable. An ordinary one half inch box beam with a length between twelve and eighteen inches is normally quite satisfactory for use with my clamp.

The inner rearward end portion 28 of beam 27 defines hole 29 extending horizontally therethrough to receive headed pin 30 to prevent that rearward end from passing forwardly into or through channel 18 defined in the body. Headed pin 30 is of a length sufficient to extend through the beam to mount a workpiece fastener arm, and to extend sufficiently therebeyond to carry pin fastener 35 in an appropriate hole defined inwardly adjacent the pin end opposite the head.

The workpiece fastener arm 36, 37 comprises a "U" shaped body formed by back 36 interconnecting similar perpendicularly extending legs 37 which define opposed cooperating pin holes 38 to receive pin 34. Legs 37 are of sufficient length, and the pin holes 38 are appropriately placed so as to mount the workpiece holder on rigid beam 27 in a depending fashion for pivotal motion thereon, as illustrated in FIG. 1. The medial portion of back 36 of the workpiece fastener arm defines threaded hole 29 extending therethrough to receive stud 42 of a particularly configured workpiece contacting shoe so that such shoe elements may be interchanged as desired.

The workpiece contacting shoe illustrated in FIG. 1 is a flat plate 40 having an outer, workpiece contacting surface element 41 formed of somewhat resiliently deformable material to aid engagement with a workpiece. The plate 40 structurally carries fastening stud 42 projecting upwardly therefrom for threaded engagement in hole 39 of the fastener arm.

A second form of workpiece fastening shoe is shown in FIG. 4 where it is seen to comprise elongate inverted "V" shaped element 43 having resilient material 44 on its lower workpiece contacting surface and mounting stud 45 projecting upwardly from the apex of the "V" so that the mounting stud would be an extension of a line that would bisect the angle between the two arms. This particular type of holding shoe is especially adapted to hold cylindrical objects such as rods or pipes. Various other shapes of workpiece contacting elements may be adapted for use with my invention to hold particularly shaped workpieces and such holding elements are within its spirit and scope.

Having thusly described the structure of my clamp, its use may be understood.

My clamp is used on machine table 12 which provides a rigid surface on which a workpiece is supported for machining operations. Such tables commonly provide a plurality of variously arrayed and configured holes 46 and slots 47 that are defined in machine tables to aid fastening of workpieces or workpiece holding devices thereon. In smaller sized machine tools, these holes commonly will accept three-eighths or half inch bolts or pins of similar size. The upper surface of machine table 12 commonly will be a flat planar surface and the holes and slots generally extend perpendicularly therethrough.

My clamp is positioned for use on such a machine table by aligning one or more of fastening holes 14 defined in base plate 13 with fastening holes 46 or slots 47 defined in the machine table. Positioning should be such and my clamp so oriented that its holding arm 11, and particularly the workpiece fastener arm 36, 37 carried by the outer end thereof, will extend to a position where the holding arm will appropriately contact a workpiece to be held down on the machine table. In this position, fasteners 48 are inserted through fastening holes 14 in the base plate and through the cooperating orifices 46, 47 in the machine table. The most common fastening means comprise nut and bolt combinations 48, and those nut and bolt combinations are the preferred fasteners for my device as they provide a most secure mechanical fastening that may be readily established and released as desired.

It is possible that headed pins (not shown) may be used for such fastening, as the forces created on the base plate of my clamp commonly will be angulated somewhat to the plane of machine table 12 to thusly cause a skewed binding force having a horizontal component upon pins extending between the base plate and the machine table to fasten those elements when the clamp is in use. Pin fastening, however, is not so secure as fastening with nut and bolt combinations and it is possible that there might be no skewed force on pins, especially in a case where the fastening arm would be parallel to the machine table.

With my clamp fastened to a machine table, a workpiece is positioned on the machine table where it is desired that it be maintained. An appropriately shaped workpiece contacting shoe is attached to the workpiece fastener arm by screwing the stud 45 of that element into threaded hole 39 of the arm. In this condition, inner end 28 of beam 27 which is carried in channel 18 defined in the housing is adjusted for vertically positioning, if necessary. If the arm need be adjusted, fastener 23 is removed from support pin 21 and the support pin is repositioned in the appropriate cooperating pair of support pin holes 19 in the body. The fastening pin is then re-established in the support pin to positionally maintain the support pin.

Fastening screw 25 is loosened if necessary, and the holding arm is manually positioned with its workpiece contacting element directly communicating with the workpiece to be held, in a position whereat the workpiece holding arm will positionally maintain the workpiece on the machine table if force be applied by the arm in a downward direction toward the machine table. With the holding arm in this position, fastening screw 25 is moved downwardly by manually manipulating turning handle 26 until the lower end of the screw contacts the upper surface of beam 27. The turning is continued until the appropriate force is created on the workpiece by reason of its reaction against the machine table on which it is supported to positionally maintain the workpiece for machining operations to be carried out. Normally, the required force for positional maintenance will not be too great and normally no more force than necessary should be exerted on the workpiece or my clamp, as excessive force merely makes the clamp more difficult to operate and shortens its life by creating greater wear and tear on the various parts.

The mechanics of the holding operation are fairly obvious, especially from the view of FIG. 3. The inner end 28 of beam 27 is pivotally supported on support pin 21, and the outer end 32 of that beam pivotally interconnects the depending workpiece fastener arm carrying the depending workpiece holding shoe, the lower surface of which contacts the workpice. With the beam thusly supported, screw 25 contacts the upper surface of the beam in a medial position between the support pin and workpiece fastener arm to exert downward force at that point. Since the housing supporting both support pin 21 and fastening screw 25 is rigidly interconnected with a machine table, the downward force created by the fastening screw will be exerted through the holding arm to the workpiece to cause a reactionary force between the undersurface of the workpiece and the supporting machine table therebeneath to positionally maintain the workpiece relative to the machine table.

It is to be particularly noted in positioning the holding arm that its forward outer end 32 may be angulated either upwardly or downwardly relative to the position of its rearward inner end 28, and its extension from the clamp body may be adjusted as desired, since the holding arm is not fastened so as to prevent its limited lineal motion relative to the clamp housing.

It is further to be noted that if base plate 13 is fastened to a machine table by only one bolt, the base plate may easily be pivoted about that interconnection to further enhance the potentiality of positional change of the holding arm. This construction provides a wide range of motion for the outer end of the hold-down arm.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. An adjustable hold-down clamp, for use on a machine table having means to fasten the hold-down clamp thereto, comprising in combination:

- a body having a base plate defining fastening means to aid releasable fastening to a machine table, said base plate structurally supporting an upstanding holding arm housing
  - defining a medial channel extending therethrough to movably carry a holding arm therein,
  - defining a plurality of cooperating pairs of vertically spaced holes to receive therebetween a support pin extending through said medial channel, and
  - threadedly carrying a vertically orientated fastening screw depending for vertical motion into the medial channel spacedly distant from the fastening pin holes; and
- a rigid elongate holding arm having first and second end portions with a first end portion having an upper surface and a parallel under surface carried within the medial channel defined in the holding arm housing with the undersurface of the holding arm supported on a support pin carried in said channel, said holding arm extending spacedly from the holding arm housing and pivotally carrying inwardly adjacent its second end a depending workpiece holder arm to contact a workpiece supported on the machine table therebeneath and exert force on the workpiece when moved downwardly by the fastening screw.

2. The invention of claim 1 further characterized by the workpiece holder arm comprising a "U" shaped body with opposed legs, pivotally carried by a pin carried by the holding arm, and back depending therebelow, said back defining releasable fastening means to receive a workpiece contacting shoe to communicate with a workpiece surface therebelow.

3. The invention of claim 1 further characterized by the first inner end of the holding arm extending beyond the holding arm housing and defining a hole carrying a headed pin, said pin having means for releasably fastening in said holes, to prevent the first inner end of the holding arm from passing into and through the chamber defined in the holding arm housing.

4. A hold-down clamp for use on a machine table having slot and hole means to aid fastening of the clamp thereto, comprising in combination:

- a body having a base defining at least one hole to receive a fastener to fasten the base to an underlying machine table, said base supporting an upstanding holding arm housing having two similar spaced sides interconnected by a top to define a medial channel to movably receive a holding arm, said housing sides each defining a plurality of similar vertically spaced holes arrayed in paired cooperative relationship adjacent each reward side edge to receive therebetween a support pin extending through said channel and said top defining a vertical hole threaded carrying a fastening screw depending downwardly into the medial channel defined in the holding arm housing spacedly distant from the support pin; and
- an elongate rigid holding arm carried in the medial channel defined in the holding arm housing and extending spacedly forwardly therefrom and rearwardly beyond the holding arm housing, with the rearward end portion of the holding arm supported by the support pin and having means to prevent the passage of that reward end portion through the medial channel defined in the body, and the forward end portion of the holding arm pivotally carrying a depending workpiece holder arm with a releasably interconnected workpiece contacting shoe to contact a workpiece therebeneath and hold that workpiece against a supporting machine table when the holding arm is forced downwardly by motion of the fastening screw.

* * * * *